US008064724B2

(12) United States Patent
Makkinejad

(10) Patent No.: US 8,064,724 B2
(45) Date of Patent: Nov. 22, 2011

(54) APPARATUS, AND ASSOCIATED METHOD, FOR DISPLAYING DATA USING DATA PAINTING OF AN ASYMMETRICAL FACIAL IMAGE

(75) Inventor: Babak Makkinejad, Troy, MI (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1062 days.

(21) Appl. No.: 11/924,237

(22) Filed: Oct. 25, 2007

(65) Prior Publication Data
US 2009/0110244 A1  Apr. 30, 2009

(51) Int. Cl.
*G06K 9/00* (2006.01)
(52) U.S. Cl. ........ 382/276; 382/100; 382/293; 382/294; 382/295; 382/118; 345/441; 345/473
(58) Field of Classification Search .................. 382/100, 382/118, 276, 293, 294, 295; 345/441, 473
See application file for complete search history.

(56) References Cited

U.S. PATENT DOCUMENTS

| | | | |
|---|---|---|---|
| 6,426,750 B1 * | 7/2002 | Hoppe | 345/428 |
| 7,098,917 B2 * | 8/2006 | Kurzweil | 345/441 |
| 7,152,024 B2 * | 12/2006 | Marschner et al. | 703/2 |
| 7,483,553 B2 * | 1/2009 | Xu et al. | 382/118 |
| 7,852,370 B2 * | 12/2010 | Peleg et al. | 348/36 |
| 2004/0012590 A1 | 1/2004 | Kurzweil | |
| 2005/0212821 A1 | 9/2005 | Xu et al. | |
| 2008/0129738 A1 * | 6/2008 | Kim et al. | 345/473 |
| 2008/0152200 A1 * | 6/2008 | Medioni et al. | 382/118 |

FOREIGN PATENT DOCUMENTS
WO   2007/066316 A1   6/2007

* cited by examiner

*Primary Examiner* — Stephen Koziol

(57) ABSTRACT

An apparatus, and an associated methodology, by which to display multi-dimensional data. Data of a plurality of dimensions is mapped onto visualization dimensions of an asymmetrical facial image. The resultant image is of characteristics permitting a viewer of the image, once displayed at a display device, to readily discern the data or changes thereto.

23 Claims, 5 Drawing Sheets

32

APPARATUS, AND ASSOCIATED METHOD, FOR DISPLAYING DATA USING DATA PAINTING OF AN ASYMMETRICAL FACIAL IMAGE

The present invention relates generally to a manner by which to display data in human perceptible form. More particularly, the present invention relates to an apparatus, and an associated methodology by which to provide a visualization of an asymmetrical facial image. Data, and its changes, is recognizable by viewing the visualization of the facial image.

BACKGROUND OF THE INVENTION

Advancements in data processing, data storage, and other digital technologies have facilitated the collection and storage of large amounts of data. The data, once collected and stored, is available for subsequent processing and analysis.

The collection and use of data is widespread, used throughout many different types of business, and other, enterprises for many varied purposes, and the same, or different, data is collected and processed for many different functions within a single enterprise. With continued advancements, yet greater capabilities by which to store and process data shall likely be available, permitting even greater amounts of data to be processed and stored pursuant to existing and new functions.

While ever-greater amounts of data are collected and processed, the data, to be useful, must be presentable in a form permitting ready interpretation of the data. With the availability of increased amounts of data, challenges associated with the presentation of the data in a form to permit its ready interpretation becomes greater.

In many presentation scenarios, data is displayed upon a computer-terminal screen, or analogous display, and an operator views the displayed data. The data before, and after, processing is sometimes in the form of data strings, sometimes large numbers of different data strings. Simple display of the data strings are difficult, even when placed in spreadsheet form, to be readily understood. As the number of data streams might be large, that is, of a large number of dimensions, the display of the data in mere numeric, or even spreadsheet, form is generally a relatively poor manner of displaying the data to permit its ready identification and interpretation.

Significant attention has been directed towards providing manners by which better to display data in a form to permit its ready interpretation. Painterly visualization techniques, for example, provide for the visualization of data by utilizing data values to alter images, and the alteration of the images, when viewed, are more readily noticeable. For instance, Herman Chernoff, in 1973, introduced a visualization technique to facilitate at least trends, i.e., changes in, multi-dimensional data. Simple, facial images are used in the visualization technique. And, facial features of the facial images are changed, depending upon changes in the data. Different data dimensions are mapped to different facial features. For example, the width of the face of the image, the location of the ears at the image, the radius of the ears, the length or curvature of the mouth, e.g., smiling or frowning, the length of the nose, etc. are each alterable. The features selected for display as part of the facial image represent trends in the values of the data of the various dimensions. Even though specific values are not, themselves, displayed, identification of the trends by an operator facilitate determination of sections of the data that are of particular interest. Ten facial characteristic parameters are identified in the Chernoff visualization technique. The head eccentricity, the eye eccentricity, the pupil size, the eyebrow slant, the nose size, the mouth shape, eye spacing, the eye size, the mouth length, and the degree of mouth opening are each facial characteristic parameters that are alterable responsive to values of the different dimensions of the data. Each parameter is represented by a number between zero and one.

A further technique is provided by Flury and Ridewyl. In this technique, multivariate data is displayed using Chernoff-like facial images in which the symmetry of the images are reduced, and eighteen parameters are provided for each side of the facial image. Specifically, the eighteen parameters include a pupil position, an eye slant, a pupil size, an eyebrow slant, a horizontal position of the eye, a vertical position of the eye, a curvature of the eye brow, a density of the eye brow, a horizontal position of the eye brow, a vertical position of the eye brow, an upper hair line, a lower hair line, a face line, the darkness of the hair, the hair shading slant, the eye size, the nose, and the size of the mouth in the image. While providing better for the visualization of multi-dimensional data, the dimensionality permitted in the existing visualization techniques and the aesthetic quality of the visualizations are generic.

If an improved visualization could be provided, better, and quicker, interpretation of the data would be possible.

It is in light of this background information relating to the display of data that the significant improvements of the present invention have evolved.

SUMMARY OF THE INVENTION

The present invention, accordingly, advantageously provides an apparatus, and an associated methodology, by which to display data in human perceptible form.

Through operation of an embodiment of the present invention, a manner is provided by which to visualize multi-dimensional data in which the data is mapped onto dimensions of an asymmetrical facial image.

Data is mapped onto features of the asymmetrical facial image that, when viewed, provide a viewer of the image with an indication, readily detectable, of the values of the data, or the trends of changes thereof.

In one aspect of the present invention, an asymmetrical facial image template is provided, such as an asymmetrical facial image representative of a cubism-based art work. The asymmetrical facial image template includes a plurality of dimensions, each of which is identifiable by a viewer of a resultant image.

The asymmetrical image template is based, for instance, on an electronic representation of a Pablo Picasso-style face painting. The electronic representation of the asymmetric image is generated through a computer-aided algorithm, such as an AARON (COHE 95) that operates to capture stylistic techniques of an artist and the style of the artist.

In another aspect of the present invention, the asymmetrical facial image template is generated using a generative grammar, and the template is modified by data that is to be visualized. A suite of supporting functions is provided that is used in the development of the image according to the palettes and techniques of a Picasso-inspired, or other cubism-inspired asymmetrical facial image.

In another aspect of the present invention, the generative grammar includes the location, size, direction, and shape grammar for the cubism-inspired image. The grammar includes a number of production of rules that, for instance, offer options on a manner by which to subdivide regions of the image. The rules include, for instance, recursive rules that result in the production of subdivisions that, in turn, re-invoke original rules. The recursion enables the grammar to account for, essentially, an infinite number of distinct compositions.

In another aspect of the present invention, data is mapped onto different dimensions of the asymmetrical facial image template. The values of the data mapped onto the various dimensions of the image template alter the image to form a transformed image that has characteristics that are responsive to the values of the data that transform the image template. The data that is mapped onto the template to form the transformed image include non-structured data, semantic/ontological data, data describing the intensity of a specific quality, multi-modal data, obtained from multi-variate statistical analysis, and a fusion of structured and non-structured data.

In another aspect of the present invention, a determiner determines the type of data that is provided thereto. The type of data is determinative of to what dimension of the image template that the data shall be applied in the transformation of the image template into the transformed image. Through such determination of the different types of data within each data set, the data is mapped to the dimension of the painting style that best represents the type of data.

In another aspect of the present invention, any of a group of asymmetrical facial image templates is provided. The style of the template is automatically extracted by using image analysis techniques. Then, a target either symmetric or asymmetric is transformed according to the extracted style.

In another alternative, the generative grammar is augmented by the inclusion of other terms that typically illuminate art history, such as lyrical, sensuous, monumental, tragic, and other terms.

When implemented, the transformed, asymmetrical facial image exhibits characteristics that are readily recognizable by a viewer. The data is thereby visually represented in a compelling, concise, and aesthetically pleasing manner. When implemented in a data mining, data analysis, data fusion service, or other data manipulative operation, the service is facilitated by providing a display that permits multiple-dimensional data to be presented in a manner permitting its quick and easy determination.

In these and other aspects, therefore, an apparatus, and an associated methodology, is provided for facilitating display of data of multi-dimensional data sets. An asymmetrical facial renderer is configured to render an asymmetrical facial image template. A mapper is configured to map data of at least a first data set of the multi-dimensional data sets onto at least a corresponding first dimension of the asymmetrical facial image to form a transformed image. A displayer is configured to display the transformed image.

A more complete appreciation of the scope of the present invention and the manner in which it achieves the above-noted and other improvements can be obtained by reference to the following detailed description of presently preferred embodiments taken in connection with the accompanying drawings, which are briefly summarized below, and by reference to the appended claims.

DETAILED DESCRIPTION

Figure 1:
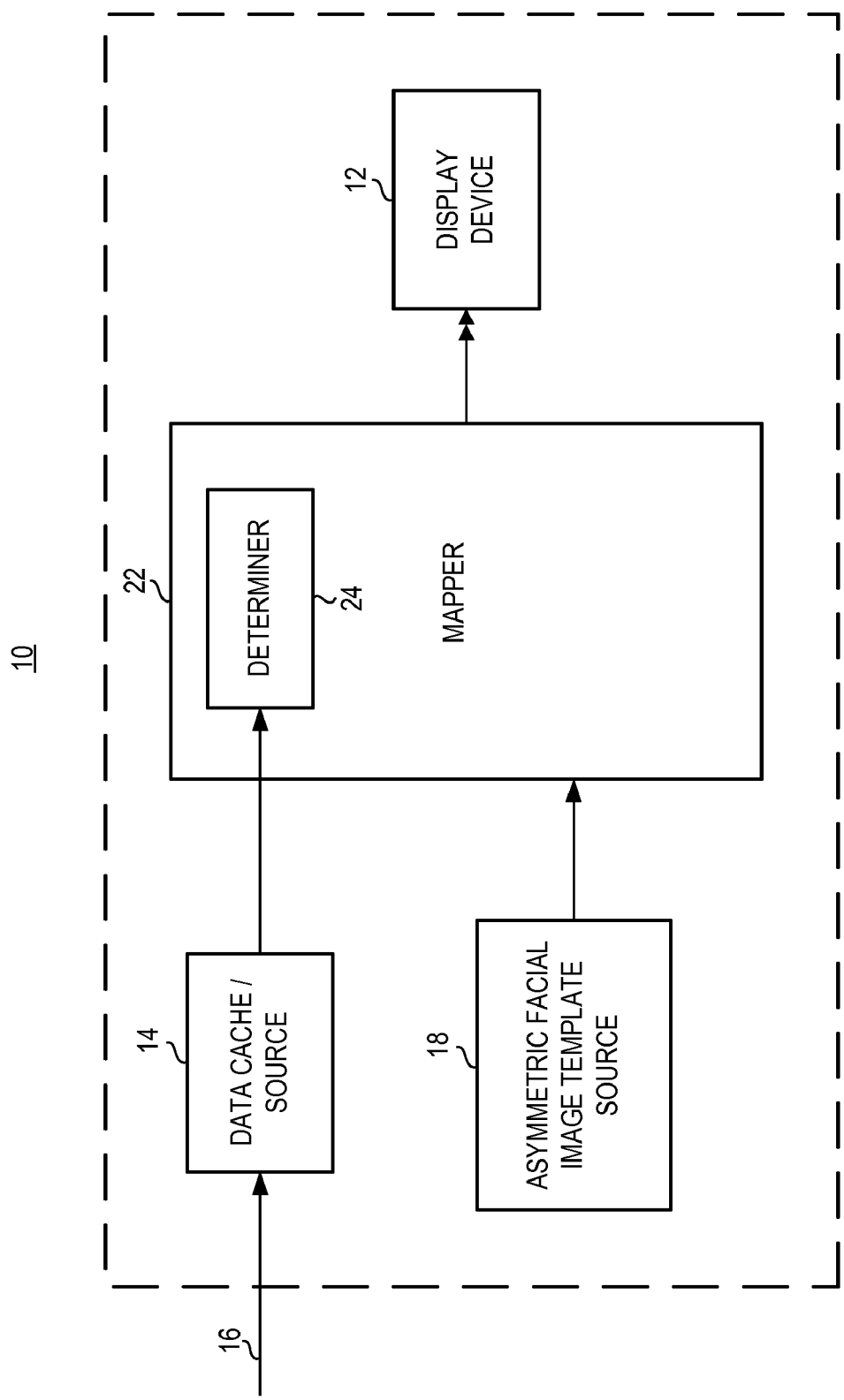
FIG. 1 illustrates a functional block diagram of an embodiment of the present invention that provides for data painting of asymmetrical facial images.

Referring first to FIG. 1, an apparatus, shown generally at 10, operates to form a visualization of data permitting a viewer easily to discern the data and trends of change thereof. The apparatus is embodied, for instance, at a computer workstation, or the like, and provides displays on a display device 12, such as a computer screen. In the exemplary implementation, the elements of the apparatus are embodied at a single device. In other implementations, the elements of the apparatus are distributed amongst separate physical devices that together function to generate a display at a display device 12 to provide indication of data to a viewer in a form permitting a viewer easily to discern the characteristics of the data. Additionally, the elements forming the apparatus are functionally represented in FIG. 1. The elements are implementable in any desired manner, including, in part, by algorithms executable by processing circuitry.

The data that is visualized is stored at a data cache 14. The data is, for instance, provided to the data cache by another entity, here by way of the line 16. The data is, for instance, data formed as a result of data manipulation operations in which the data is processed and is to be viewed, once processed. The data cache at which the data is stored is any of various conventional memory devices of storage capacities permitting storage of the data that is to be displayed. The data cache forms, variously, an electronic memory, a magnetic memory, or any other storage mechanism that permits access to the contents of the data stored thereat.

The apparatus further includes an asymmetrical facial template 18 that stores one or more image templates. The image templates are electronic representations of asymmetrical facial images, such as cubism-inspired images, such as an image of a Picasso painting having asymmetrical facial representations exemplified by Picasso paintings generally in the period extending between 1941 and 1943. The facial image template source operates, for instance, analogous to operation of an AARON (COHE 95) that captures the stylistic techniques of an artist and of the artist's style. Image templates are creatable in other manners, such as internet-based image generation techniques. The image templates are used as a template by which to create an asymmetrical facial image that is subsequently displayed at the display device 12.

The apparatus further includes a mapper 22 that maps data sourced at the data cache onto the facial image template to form a transformed image that is displayable upon the display 12. The mapper here includes a determiner 24 that determines the data type of the data that is to mapped onto the image template. The determiner determines the data type of the data, and once determined, the mapper causes mapping of the data in an appropriate dimension of the asymmetrical facial image. Determination of the data type is, in other implementations, determined elsewhere, or is otherwise identified, such as identifier tags associated with different parts of the data. The facial image dimensions are associated with a generative grammar. That is to say, the mapper maps the data to associated dimensions to cause a transformed image to be formed, thereafter to be displayed at the display 12. The dimensions and associated generative grammar defines a location, a color, a size, a direction of orientation, and a shape of the asymmetrical facial image. The mapper further operates pursuant to production rules. The production rules include options for how to subdivide regions of the image. Some of the rules are recursive in so far as the rules produce subdivisions that, in turn, re-invoke the original rules.

The data stored at the data cache is of any of a plurality of dimensions. The data dimensions, i.e., types, include non-structured data, semantic/ontological data, data describing the intensity of a specific quality, multi-modal data, such as from multi-variate statistical analysis, and a fusion of structured on non-structured data. Through determination, or otherwise having knowledge of, the data type, the mapper operates to map the data onto a dimension of the painting that best represents the type of the data.

Once painted onto the asymmetrical image, the characteristics of the transformed image with the painted dimensions are altered. The transformation, i.e., alteration, of the asymmetrical image is discernable by a viewer. An operator that manipulates data is able quickly to discern the values of the data, or at least their trends of change, by viewing the transformed image.

A painterly visualization is utilized by which to discern values of the data, or changes to the values of the data, in the various dimensions. Modern painting styles, such as the utilized style in which an asymmetrical facial image is provided, provide multiple dimensions by which to portray data. The resultant visualization is expressive and permits unique data to be recognized easily in a sea of homogenous data. Through proper matching of the dimensions of the data and of the visualization, the resultant visualization painting is evocative of the underlying data. The visualization dimensions to which the data dimensions are mapped included a location dimension, a color dimension, a size dimension, a direction dimension, and a shape dimension. By varying each of these dimensions, a transformed image is created that is both cohesive and expressive.

In the exemplary implementation, the dimensions of the image are mapped over a particular measurement of the underlying data object. For example, the color of a region of the image depends upon the particular data set to which that data point belongs.

Figure 2:
FIGS. 2 and 3 illustrate exemplary images, facial images whose template are changed pursuant to data mapping operations pursuant to an embodiment of the present invention.
Figure 3:
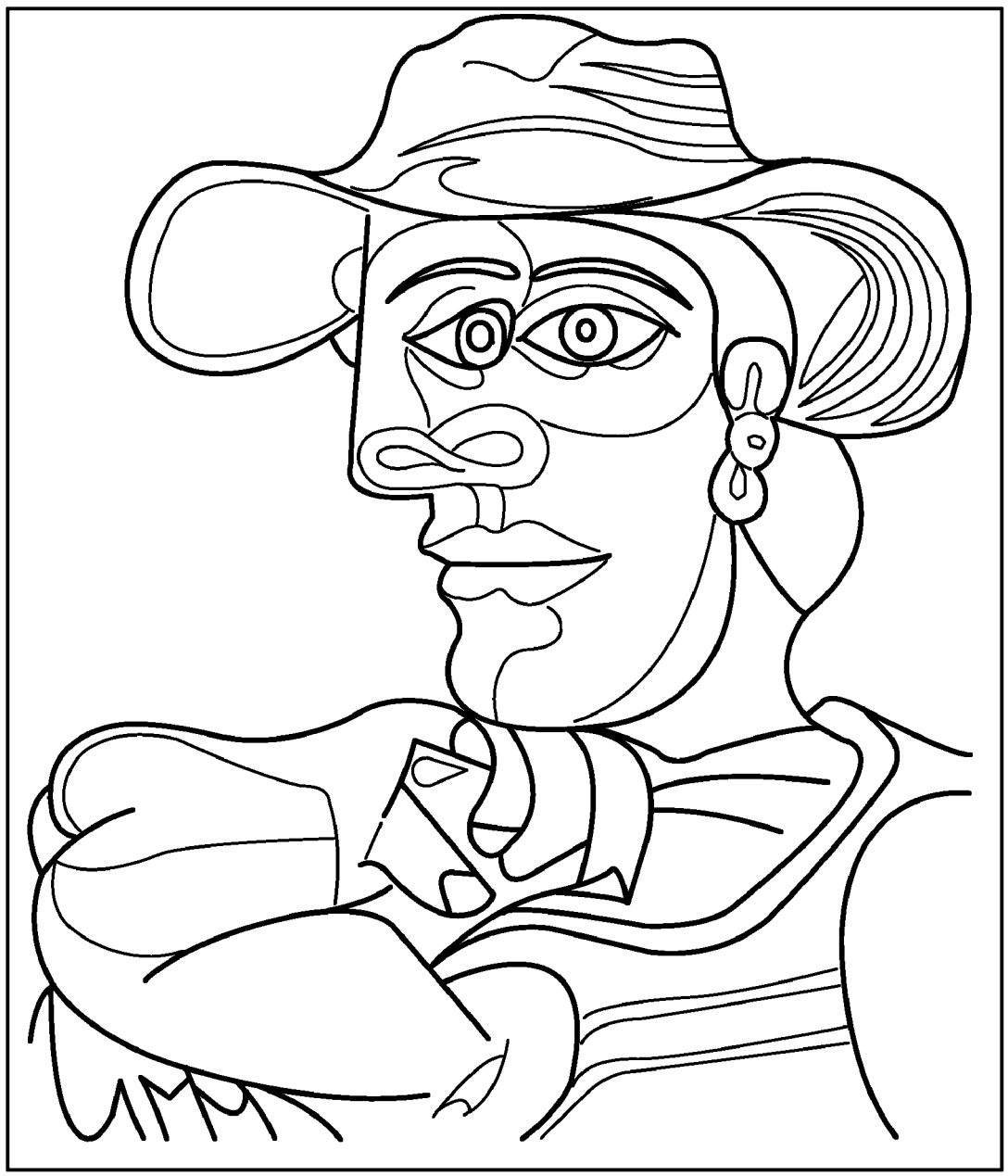

FIGS. 2 and 3 illustrate exemplary images, shown generally at 32 and 34, that comprise asymmetrical facial images to which data dimensions are mapped onto visualization dimensions to form a transformed image that is viewed by a viewer. The image 32 shown in FIG. 2 is a Picasso work, entitled "Dora Maar Seated" and the image 34 shown in FIG. 3 is also a Picasso work, entitled "Sailor". Other visualizations of other asymmetrical facial images are analogously utilized in manners similar to the illustrated visualization shown in FIG. 2. As noted, the generative grammar includes a location, color, size, direction, and shape of the image. Production rules provide options on how to subdivide regions of the image. Some of the rules are recursive in so far as they produce subdivisions that, in turn, re-invoke the original rules. Recursion enables the grammar to account for infinite number of distinct compositions.

In the exemplary implementation, combining painterly visualization and asymmetric faces, a gain of one hundred eighty dimensions (18×2×5) are provided for the data visualization. That is to say, eighteen dimensions come from the asymmetry of facial features for each side of the facial image, two come from the right and left sides of the facial image, and five come from the five dimensions of the grammar of the facial image, here the location, color, size, direction, and shape of the image. The type of data is determined within each data set, and the data is mapped to a corresponding dimension of the image that best represents that type of data. When transformed, the resultant image is of characteristics that identify the mapped data and is easily discernible by a viewer of the image.

Figure 4:
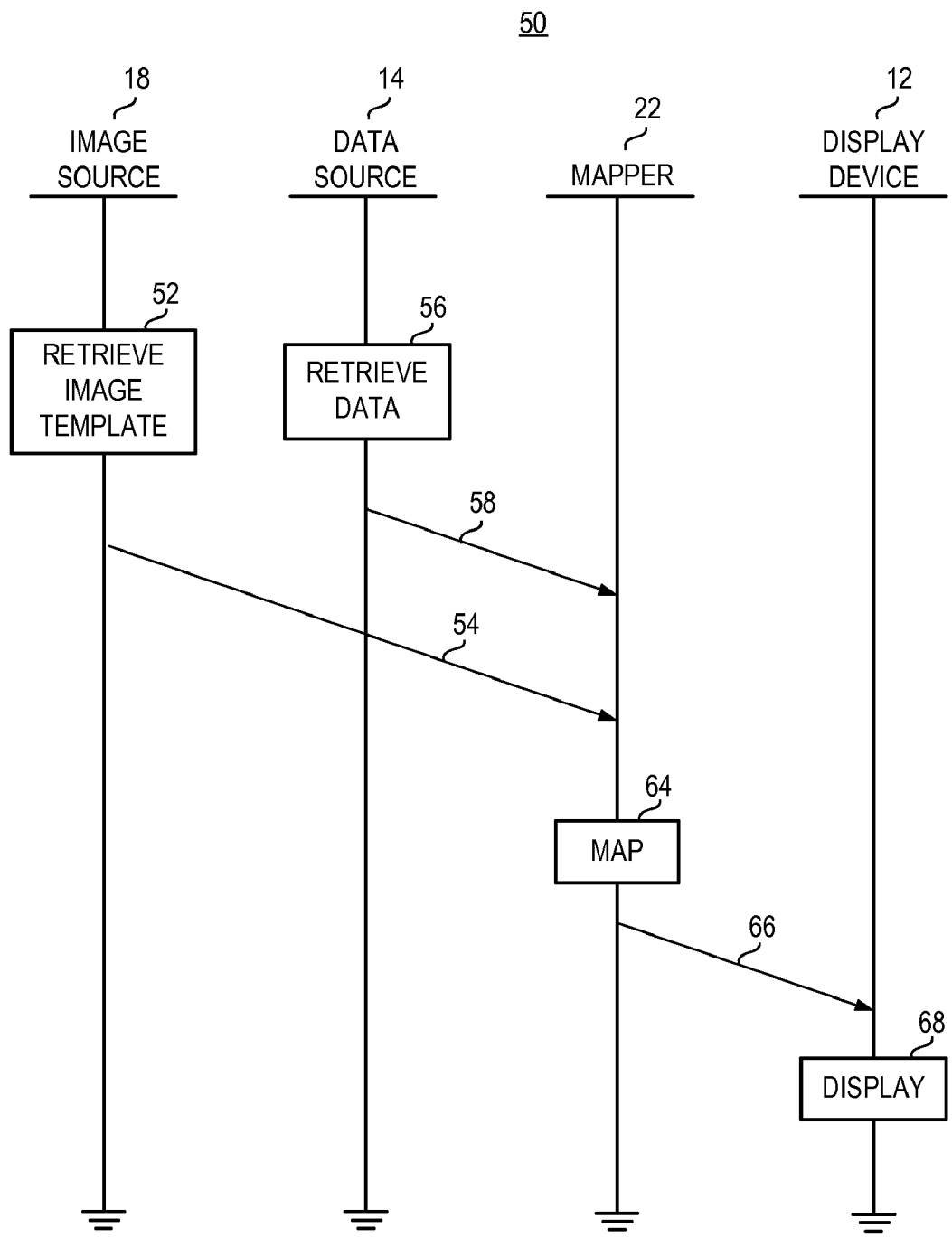
FIG. 4 illustrates a sequence diagram representative of operation of an embodiment of the present invention.

FIG. 4 illustrates a sequence diagram, shown generally at 50, representative of operation of an embodiment of the present invention. Here, an asymmetric facial image template source 18, a data cache 14, a mapper 22, and a display 12, corresponding to the element shown in the apparatus 10 illustrated in FIG. 1 are again represented.

In operation, an operator selects an image cached at the image source 18, and the electronic representation of the image is provided, here indicated by the segment 54 to the mapper 22. Additionally, data that is to be analyzed is retrieved, indicated by the block 56, at the data cache 14 and provided, indicated by the segment 58 to the mapper. The mapper operates to map data dimensions onto visualization dimensions, indicated by the block 64. And, the resultant image, a transformed image, is formed and provided, here indicated by the segment 66 to the display device 12. The operator views the display displayed at the display device and is able, by viewing of the display to discern the data or changes thereto.

In an exemplary implementation, finger-print matching is performed. In another, analogous implementation, DNA matching is performed. Finger-print data and DNA data are exemplary of nonstructured data. In exemplary matching operations, data is compared with a reference set of data to determine the extent of a match. Data that matches well with the reference set results, e.g., with a resultant facial image that is less asymmetrical relative to data that doesn't match well with the reference data. Additionally, or alternatively, a good match will be displayed in a resultant image that is of a location, color, size, direction, and/or shape dimensions that correspond well to that of a reference set of data.

Figure 5:
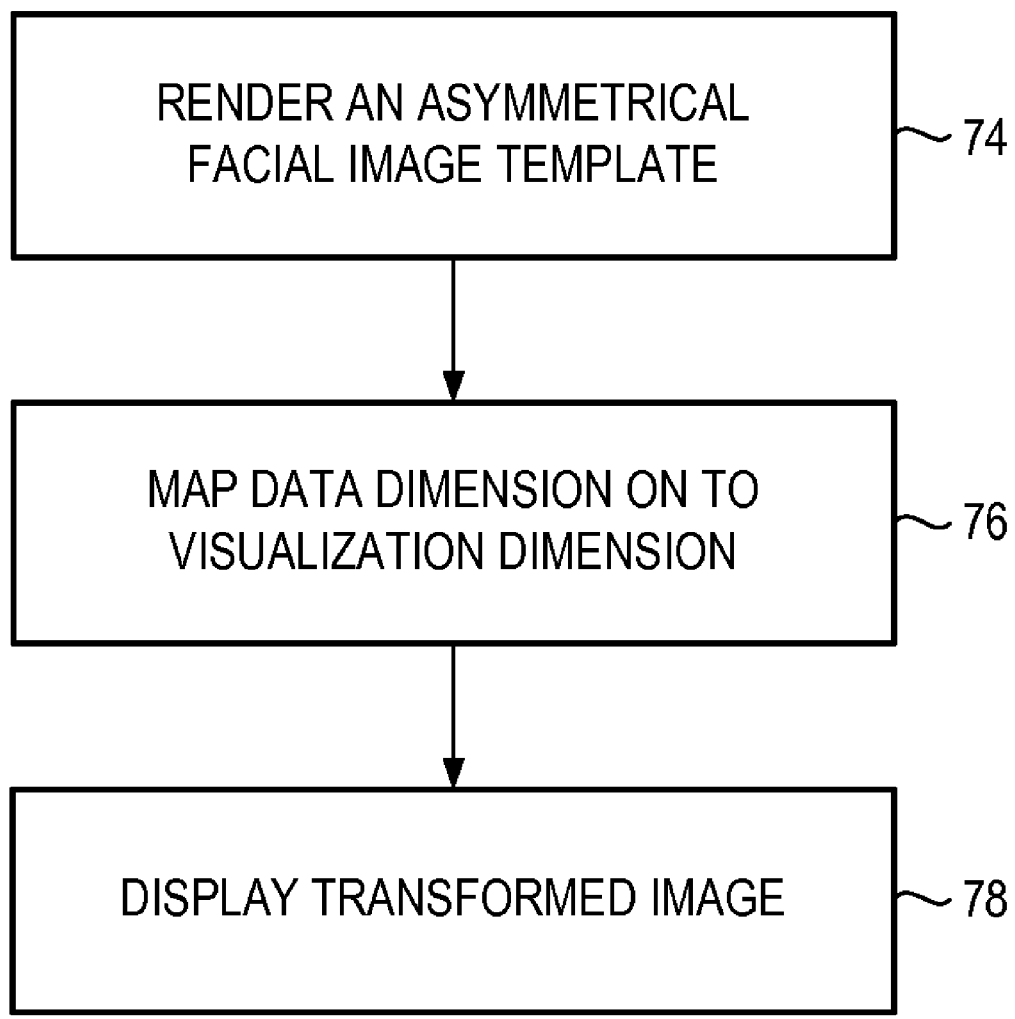
FIG. 5 illustrates method flow diagram representative of the method of operation of an embodiment of the present invention.

FIG. 5 illustrates a method flow diagram, shown generally at 72, representative of the method of operation of an embodiment of the present invention. The method facilitates display of data of multi-dimensional data sets. First, and as indicated by the block 74, an asymmetrical facial image template is rendered. Then, and as indicated by the block 76, data of at least a first data set of the multi-dimensional data sets are mapped onto at least a corresponding first dimension of the asymmetrical facial image to form a transformed image.

Then, and as indicated by the block 78, the transformed image is displayed.

Thereby, through operation of an embodiment of the present invention, a manner is provided by which to display multi-dimensional data on an asymmetrical facial image. Data dimensions are mapped onto visualization dimensions. A viewer of the resultant image is able to discern the data that is mapped onto the image.

Presently preferred embodiments of the invention and many of its improvements and advantages have been described with a degree of particularity. The description is of preferred examples of implementing the invention and the description of preferred examples is not necessarily intended to limit the scope of the invention. The scope of the invention is defined by the following claims.

What is claimed is:

1. Apparatus for facilitating display of data of multi-dimensional data sets, said apparatus comprising:
   an asymmetrical facial image renderer configured to render an asymmetrical facial image template;
   a mapper configured to map data of at least a first data set of the multi-dimensional data set of the multi-dimensional data sets onto at least a corresponding first dimension of the asymmetrical facial image to form a transformed image; and a displayer configured to display the transformed image.

2. The apparatus of claim 1 wherein the asymmetrical facial image template rendered by said asymmetrical facial renderer comprises a cubism-configured facial image.

3. The apparatus of claim 1 wherein a data set of the multi-dimensional data sets comprises a non-structured data set and wherein said mapper is configured to map data of the non-structured data set onto the first dimension of the asymmetrical facial image.

4. The apparatus of claim 1 wherein a data set of the multi-dimensional data sets comprises an ontological data set and wherein said mapper is configured to map data of the ontological data set onto the first dimension of the asymmetrical facial image.

5. The apparatus of claim 1 wherein a data set of the multi-dimensional datasets comprises an intensity descriptive data set and wherein said mapper is configured to map data of the intensity descriptive data set onto the first dimension of the asymmetrical facial image.

6. The apparatus of claim 1 wherein a data set of the multi-dimensional data sets comprises a fusion data set, formed of fusion of structured data together with nonstructured data and wherein said mapper is configured to map data of the data set onto the first dimension of the asymmetrical facial image.

7. The apparatus of claim 1 wherein a data set of the multi-dimensional data sets comprises a multi-modal data set and wherein said mapper is configured to map data of the multi-modal data set onto the first dimension of the asymmetrical facial image.

8. The apparatus of claim 1 wherein the first dimension onto which said mapper is configured to map the first data set comprises a location dimension.

9. The apparatus of claim 1 wherein the first dimension onto which said mapper is configured to map the first data set comprises a color dimension.

10. The apparatus of claim 1 wherein the first dimension onto which said mapper is configured to map the first data set comprises a size dimension.

11. The apparatus of claim 1 wherein the first dimension onto which said mapper is configured to map the first data set comprises a directional dimension.

12. The apparatus of claim 1 wherein the first dimension onto which said mapper is configured to map the first data set comprises a shape dimension.

13. The apparatus of claim 1 further comprising as data receiver configured to receive data of the at least the first data set of the multi-dimensional data set, the data mapped by said mapper received by said receiver and provided thereto.

14. The apparatus of claim 13 further comprising a determiner configured to determine to which of the multi-dimensional data set that the data received by said data receiver belongs.

15. A method for facilitating display of data of multi-dimensional data sets, said method comprising:

rendering an asymmetrical facial image template;

mapping data of at least a first data set of the multi-dimensional data sets onto at least a corresponding first dimensional of the asymmetrical facial image to form a transformed image; and displaying the transformed image.

16. The method of claim 15 wherein the asymmetrical facial image template comprises a cubism-configured facial image.

17. The method of claim 15 wherein said mapping comprises mapping a plurality of data sets onto a corresponding plurality of plurality of dimensions of the asymmetrical facial image to form a transformed image, transformed in a plurality of dimensions.

18. The method of claim 15 wherein said rendering, mapping, and displaying are performed automatically.

19. The method of claim 15 wherein the asymmetrical facial image template rendered during said operation of rendering is based upon a selected non-abstract-art work created by a selected artist.

20. A method for displaying data in human perceptible form, said method comprising:

on a computer, modifying aspects of an asymmetrical facial image responsive to data of data sets such that a modified asymmetrical facial image visually represents that data of the data sets used to modify the asymmetrical facial image; and on a display device, displaying the asymmetrical facial image, once the aspects thereof are modified responsive to data of the data sets.

21. An apparatus for visually displaying multi-dimensional data set comprising:

an asymmetrical facial image template source configured to output an asymmetrical facial image;

a mapper that alters various features of said asymmetrical facial image, wherein each feature of said facial image that is altered is altered in accordance with data from said multi-dimensional data set to produce a transformed image that visually represents said data from said multi-dimensional data set that was used in transforming said asymmetrical facial image into said transformed image; and a display device to display the transformed image.

22. The apparatus of claim 21, wherein said mapper further determines different types of data being used in transforming said asymmetrical facial image and selects a feature of said facial image to alter in response to each particular type of data.

23. The apparatus of claim 22, wherein said mapper selects a feature of said facial image that best represents the type of data being represented and then alters that feature to represent data of the corresponding type.

* * * * *

UNITED STATES PATENT AND TRADEMARK OFFICE
CERTIFICATE OF CORRECTION

PATENT NO. : 8,064,724 B2
APPLICATION NO. : 11/924237
DATED : November 22, 2011
INVENTOR(S) : Babak Makkinejad It is certified that error appears in the above-identified patent and that said Letters Patent is hereby corrected as shown below:

In column 7, line 50, in Claim 13, after "at least" delete "the".

In column 8, line 14, in Claim 17, after "plurality of" delete "plurality of".

In column 8, line 39, in Claim 21, after "is altered" delete "is altered".

Signed and Sealed this
Twenty-eighth Day of August, 2012

David J. Kappos
*Director of the United States Patent and Trademark Office*